(12) United States Patent
DeMone et al.

(10) Patent No.: US 6,266,750 B1
(45) Date of Patent: Jul. 24, 2001

(54) VARIABLE LENGTH PIPELINE WITH PARALLEL FUNCTIONAL UNITS

(75) Inventors: Paul W. DeMone; Peter B. Gillingham, both of Kanata (CA)

(73) Assignee: Advanced Memory International, Inc., Austin, TX (US)

( * ) Notice: Subject to any disclaimer, the term of this patent is extended or adjusted under 35 U.S.C. 154(b) by 0 days.

(21) Appl. No.: 09/232,051

(22) Filed: Jan. 15, 1999

(51) Int. Cl.[7] .................................................. G06F 12/08
(52) U.S. Cl. .............................................................. 711/169
(58) Field of Search ................................... 711/154, 167, 711/169

(56) References Cited

U.S. PATENT DOCUMENTS

| | | | |
|---|---|---|---|
| 5,946,260 | * | 8/1999 | Manning .......................... 365/230.03 |
| 6,088,774 | * | 7/2000 | Gillingham .......................... 711/167 |
| 6,175,905 | * | 1/2001 | Manning ............................. 711/169 |
| 6,178,488 | * | 1/2001 | Manning ............................. 711/169 |

* cited by examiner

Primary Examiner—Kevin L. Ellis
(74) Attorney, Agent, or Firm—Fliesler, Dubb, Meyer & Lovejoy, LLP

(57) ABSTRACT

Method and apparatus for implementing a variable length pipeline in a packet-driven memory control system, including a command front end and one or more parallel command sequencers. The command front end decodes an external command packet into an internal command and issues it to a selected one of the command sequencers. The command has associated therewith a desired latency value. A first group of one or more memory control steps for the given command is performed by the command front end if the desired latency value is less than a threshold latency value, or by the selected command sequencer if the desired latency value is greater than or equal to the threshold latency value. The remainder of the memory control steps required for the command are performed by the selected command sequencer. If the first control steps are to be performed by the selected command sequencer, then depending on the desired latency value, the command sequencer further may insert one or more wait states before doing so.

27 Claims, 12 Drawing Sheets

VARIABLE LENGTH PIPELINE WITH PARALLEL FUNCTIONAL UNITS

BACKGROUND TO THE INVENTION

1. Field of the Invention

The present invention relates generally to command processing applications in high bandwidth memory systems.

2. Cross Reference to Other Applications

The following pending application is owned by the assignee of the present application, and its contents are hereby incorporated by reference:

Ser. No. 09/132,158 filed Aug. 10, 1998, invented by Gustavson et. al and entitled, MEMORY SYSTEM HAVING SYNCHRONOUS-LINK DRAM (SLDRAM) DEVICES AND CONTROLLER.

3. Description of the Related Art

The evolution of the dynamic random access memories used in computer systems has been driven by ever-increasing speed requirements mainly dictated by the microprocessor industry. Dynamic random access memories (DRAMs) have generally been the predominant memories used for computers due to their optimized storage capabilities. This large storage capability comes with the price of slower access time and the requirement for more complicated interaction between memories and microprocessors/microcontrollers than in the case of say static random access memories (SRAMS) or non-volatile memories.

In an attempt to address this speed deficiency, DRAM design has implemented various major improvements, all of which are well documented. Most recently, the transition from Fast Page Mode (FPM) DRAM to Extended Data Out (EDO) DRAMs and synchronous DRAMs (SDRAMS) has been predominant. Further speed increases have been achieved with double data rate (DDR) SDRAM, which synchronizes data transfers on both clock edges. New protocol based memory interfaces have recently been developed to further increase the bandwidth and operating frequencies of synchronous memories.

As the complexity of these memories has increased, the associated control systems responsible for internally managing the operation of the memories have also become more complex. These command-driven control systems internally must typically process a stream of commands or instructions that overlap in execution time and have programmable latency (time from receipt of command to first control outputs asserted in response). Programmable latency is desirable in such systems in order to allow the memory controller to schedule the use of shared data, address or control buses for optimum usage. Since the processing of two or more commands may be required to occur simultaneously, many control systems implement multiple functional units operating in parallel. The minimum latency of the control system is therefore limited by the need to (i) decode the command control field(s), (ii) determine the programmed latency associated with the identified command, and (iii) issue the command to a number of parallel functional units before the first control output action can be determined for use by the memory.

A conventional implementation of such a memory system control block comprises a single front end decoding block which decodes external commands and issues internal commands to multiple identical functional elements capable of operating in parallel. The minimum latency therefore cannot be shorter than the time it takes to decode the command in the front end block plus the time required to issue the command to a parallel functional unit, and finally, the time that the functional unit takes to initialize and issue its first control action. The common approach to reducing the minimum latency described above is by replicating the command decoding logic within each parallel functional unit and feeding the command stream to all parallel functional units simultaneously to eliminate the issue and initialization delay. This advantage comes with the cost of a large increase in overall logic complexity, redundant logic, and increased power consumption. As frequency and bandwidth requirements increase, there is a need for a memory system control block which makes optimum use of area and power consumption and which can process commands with a reduced minimum latency than previously achieved in the prior art.

SUMMARY OF THE INVENTION

It is therefore an object of the present invention to provide a command processing system for use in a high bandwidth memory interface which processes commands with a minimum latency.

It is another object of the present invention to provide the command processing system with a minimum increase to the command circuitry.

According to the invention, roughly described, a packet-driven memory control system which implements a variable length pipeline includes a command front end and one or more parallel command sequencers. The command front end decodes an external command packet into an internal command and issues it to a selected one of the command sequencers. The command has associated therewith a desired latency value. A first group of one or more memory control steps for the given command is performed by the command front end if the desired latency value is less than a threshold latency value, or by the selected command sequencer if the desired latency value is greater than or equal to the threshold latency value. The remainder of the memory control steps required for the command are performed by the selected command sequencer. If the first control steps are to be performed by the selected command sequencer, then depending on the desired latency value, the command sequencer further may insert one or more wait states before doing so.

DETAILED DESCRIPTION OF THE INVENTION

Figure 1:
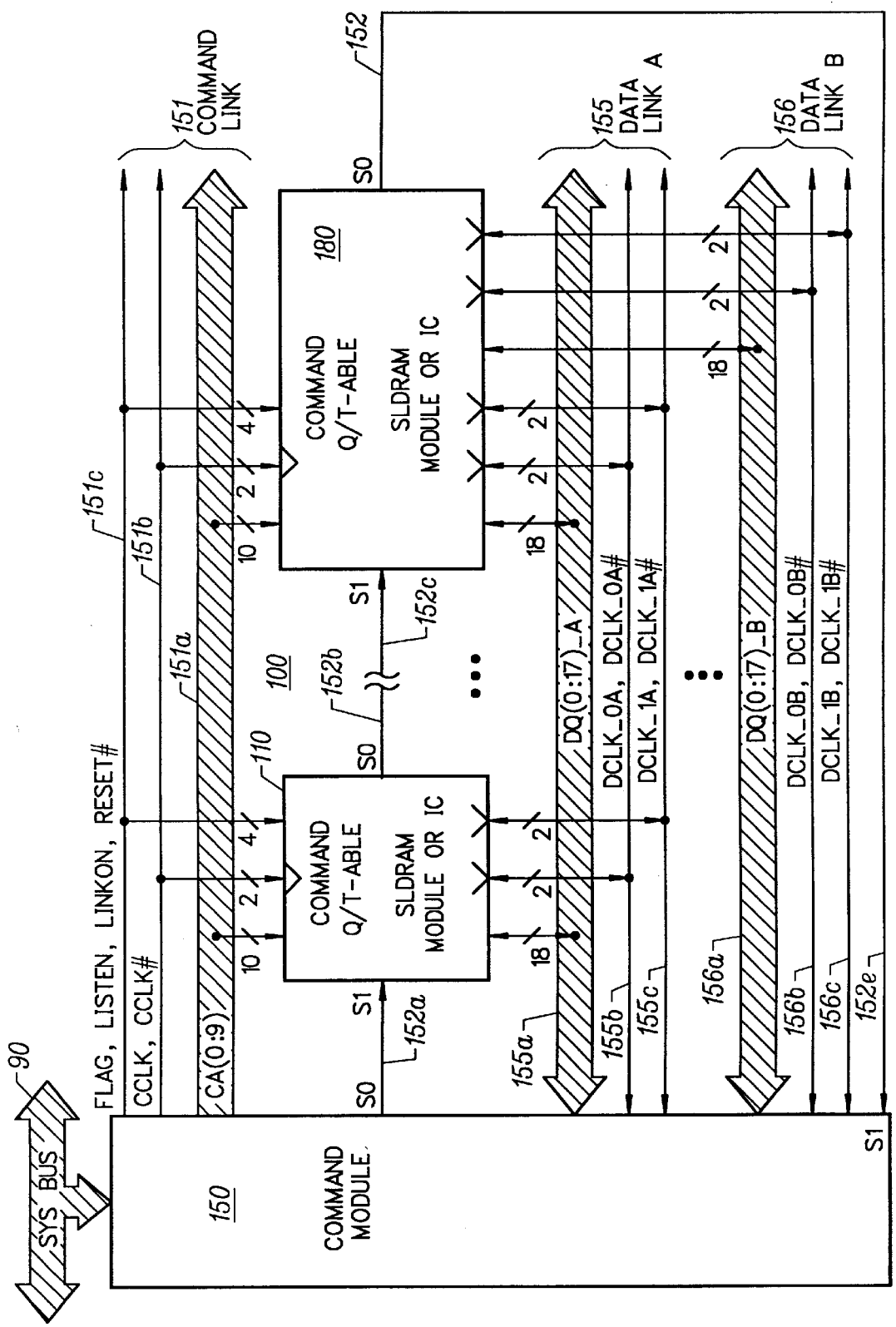
FIG. 1 is a simplified block diagram of a synchronous link memory system incorporating features of the invention.

FIG. 1 provides a simplified view of a memory system employing a packet based synchronous link architecture (SLDRAM). The system which is described more fully in the above-incorporated patent application generally comprises a command module 150 (typically implemented by a memory controller), and a plurality of SLDRAM modules or individual IC's 110–180. The command link 151 is used by the command module to issue commands, a command system clock, control signals and address information to each of the SLDRAMs. Data is written into or read out of the SLDRAMs via the DataLinks 155a and 156a in synchronization with source-synchronous clocks 155b, 155c, 156b and 156c. Within this system, an embodiment of the command processing in accordance with the invention will be described.

Figure 2A:
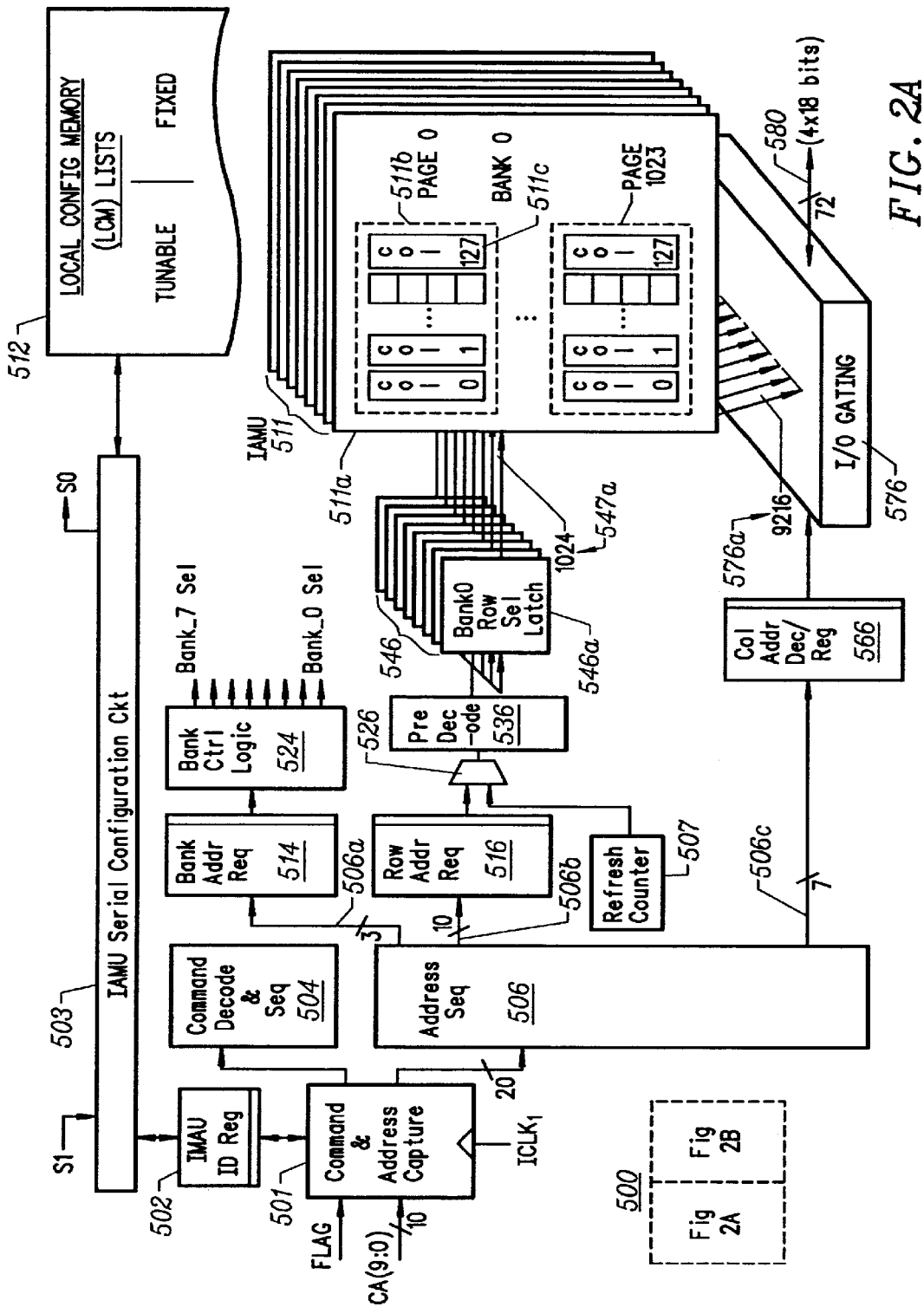
FIGS. 2A and 2B together represent a simplified block diagram of the synchronous link DRAM (SLDRAM) module or integrated circuit of FIG. 1.
Figure 2B:
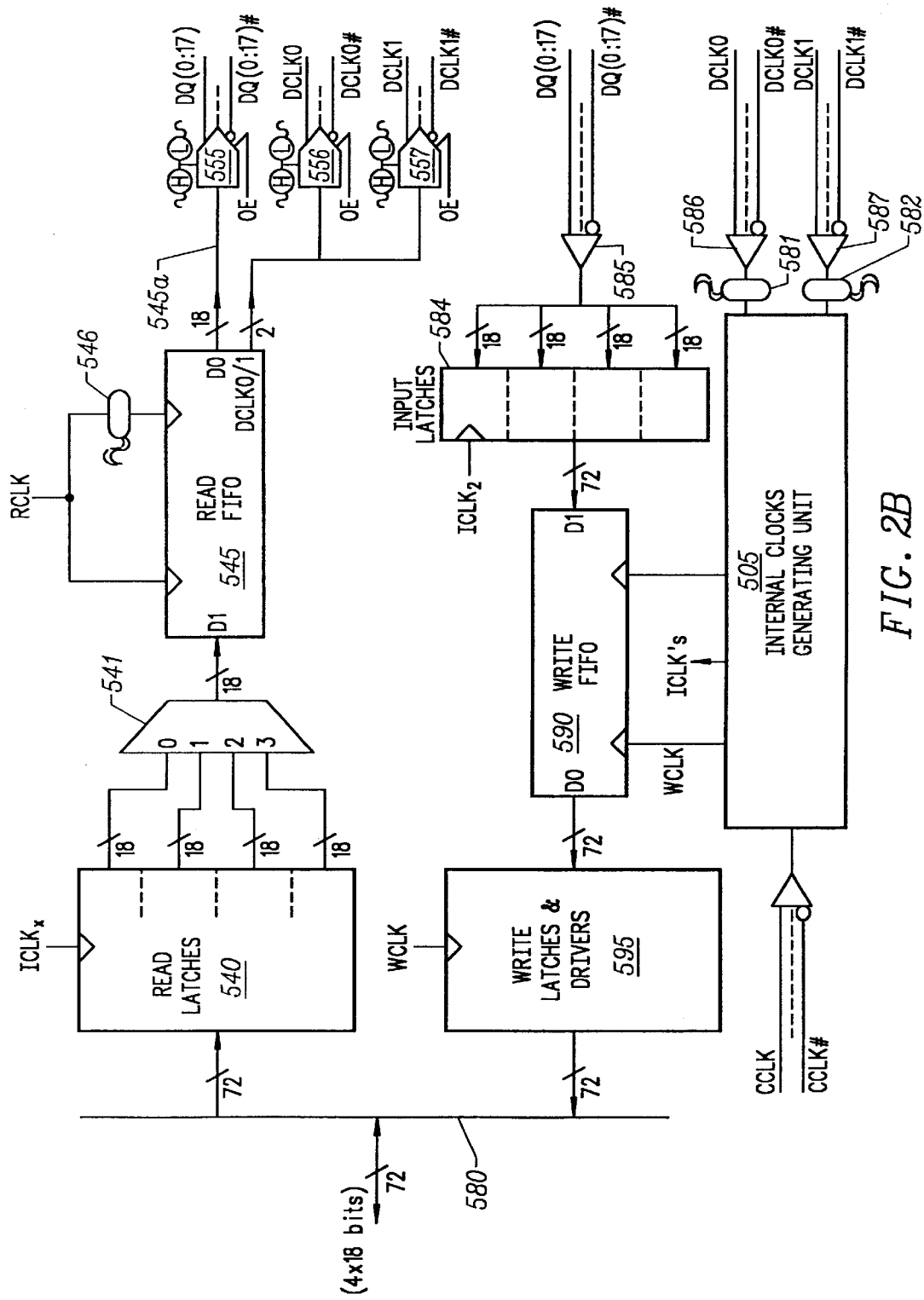

FIGS. 2A and 2B together illustrate the general structure of an SLDRAM memory integrated circuit of FIG. 1. The structure and operation of the circuit is described broadly in the above-incorporated patent application. The command decode and sequencer unit 504 will be described in more detail below.

Figure 3A:
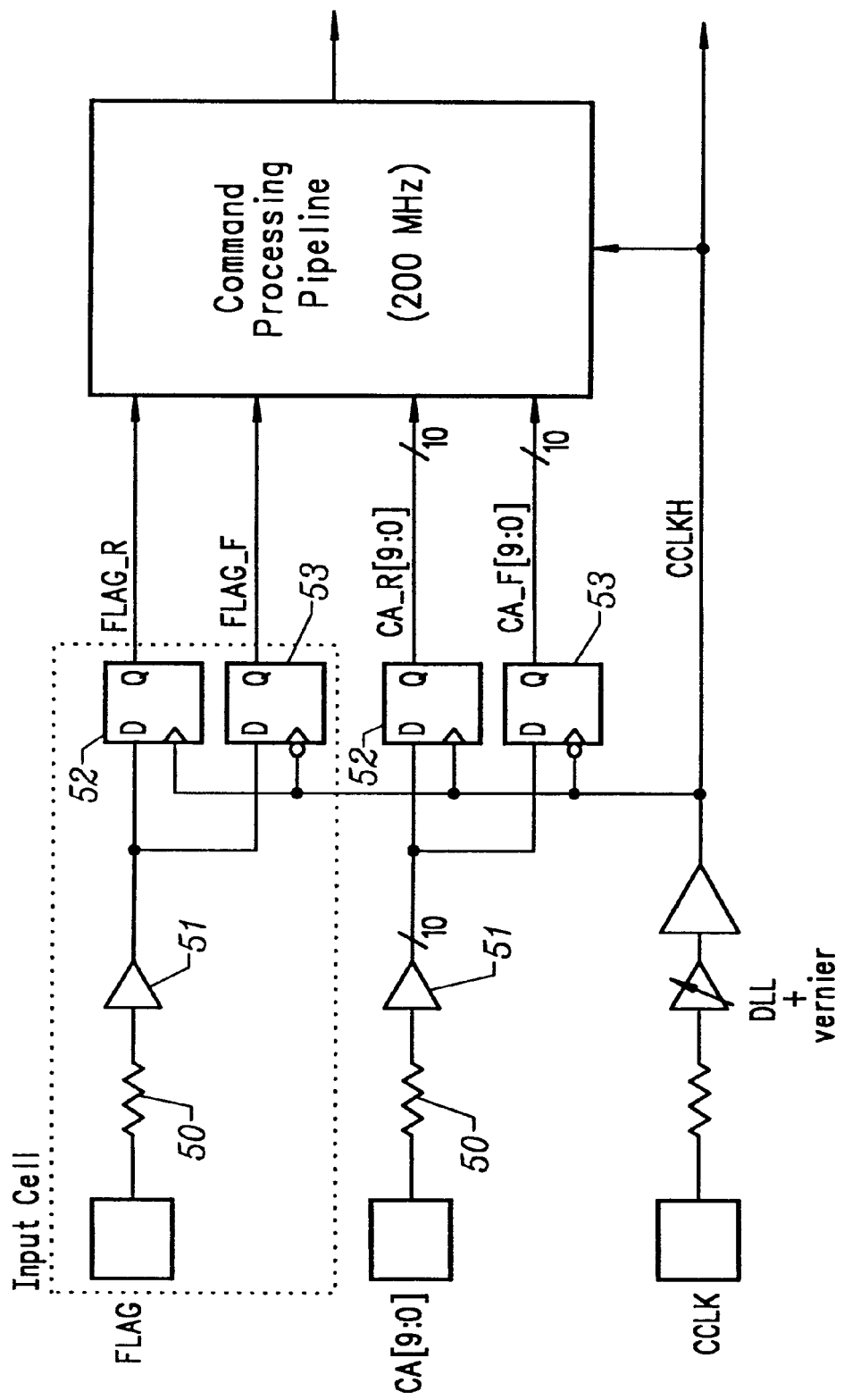
FIGS. 3A and 3B are schematics and timing diagrams illustrating the conversion of external command, address and flag signals of FIG. 2 into internal command and address signals to be processed.
Figure 3B:
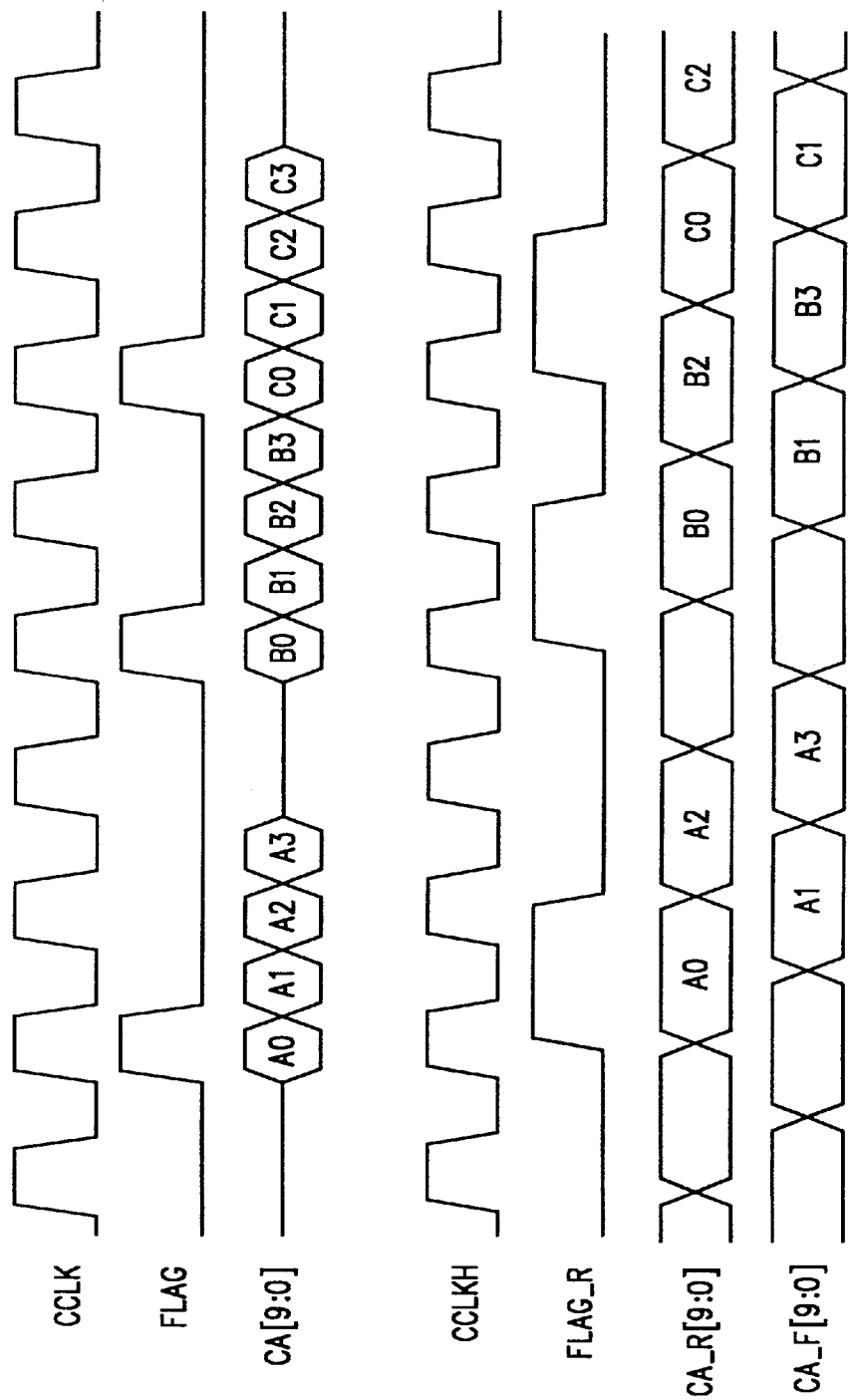

FIG. 3A illustrates the input stage of the command decoder 504 of FIG. 2A. The incoming external command and address signals CA[9:0] along with the FLAG and command clock CCLK signals are received via input cells each comprising an input protection device 50, an input buffer 51 and two D-type flip/flops 52 and 53 for latching the command/address and FLAG signals on both rising and falling edges of the command clock CCLK. As a result, the eleven (11) incoming signals made up of FLAG and CA[9:0] operating at 400 Mbps are converted internally into twenty two (22) internal command/address signals consisting of FLAG_R, FLAG_F, CA_R[9:0], and CA_F[9:0], operating at 200 Mbps. The command clock also has a delay locked loop (DLL) and vernier delay in its input path, which are used to properly latch the incoming commands and address signals at the appropriate time within the system. FIG. 3B illustrates the relative timing of the input stage. CCLK is a free-running clock. Upon assertion of the FLAG signal, command/address words begin to be latched on the rising edge of the delayed internal version of the command clock CCLKH. On the subsequent rising edge of the internal flag signal FLAG_R, the internal command/address words begin to be accepted into the system at one half the frequency of the external CCLK. The command/address words are alternated between the rising and falling edge command/address internal busses CA_R[9:0] and CA_F[9:0] as indicated by A0, A1, A2, A3, etc.

Figure 4:
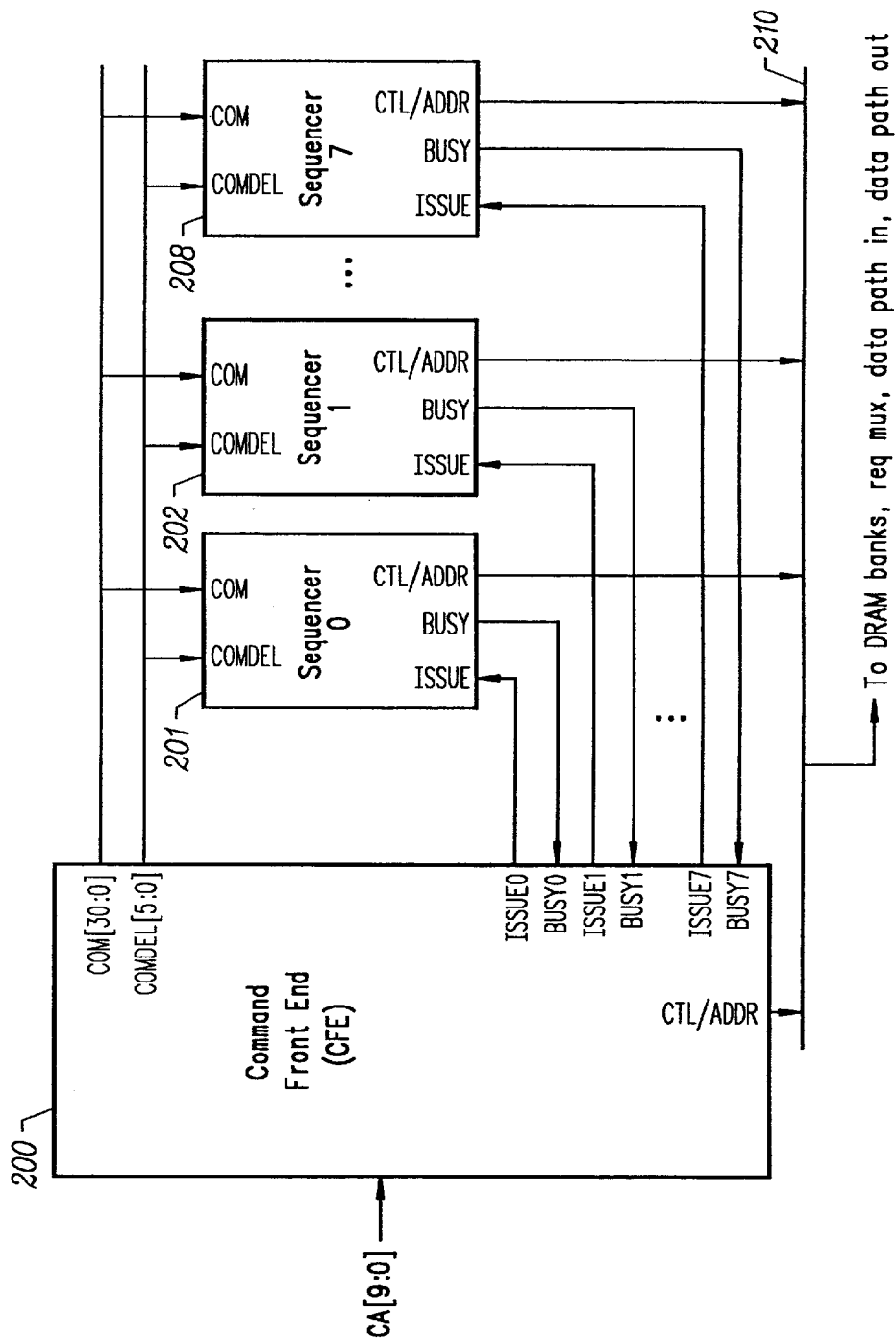
FIG. 4 is a simplified block diagram of the command processing pipeline incorporating an embodiment of the invention.

FIG. 4 is a block diagram illustrating the command processing pipeline according to an embodiment of the invention. A command decoder front end CFE 200 receives the command packet as four consecutive 10-bit words on CA[9:0]. It then internally assembles and decodes the command packet into a 31-bit internal command COM[30:0] which is issued to a selected one of a plurality of parallel functional units or command sequencers 201–208. The CFE 200 also generates a 6-bit command delay signal COMDEL[5:0] which is determined by comparing the latency in the selected latency register with a predetermined threshold. The CFE 200 initializes each of the sequencers by asserting the ISSUE0–ISSUE7 signals. The available or busy state of a sequencer is fedback to the CFE via the BUSY0–BUSY7 signals. Both the CFE 200 and each of the sequencers also have a multi-bit control/address output CTL/ADD which is used to send out the control signals to the memory banks, the data path, etc. The CTL/ADD signal coming from the CFE 200 corresponds to control signals being generated by the CFE itself as will be described in more detail below.

With reference to FIG. 2A and FIG. 4, in accordance with an embodiment of the present invention, an SLDRAM memory device receives streams of command packets as 4 consecutive 10-bit words on the CA[9:0] bus. Each 40 bit command packet is assembled and then decoded by the command front end or CFE block 200. For SLDRAM commands that utilize user-programmable latencies (such as memory reads, memory writes, and register reads), the CFE 200 selects the appropriate latency value based upon the command type and issues the command packet and latency value to one of eight identical parallel functional units called command sequencers 201–208, with sequencer 0, 201 having the highest priority and sequencer 7, 208 having the lowest priority. The determination of whether to perform the first group of control steps within the CFE 200 or to forward the entire command to a selected command sequencer depends on the command's specified latency. Once a command is decoded, if the desired latency is determined to be shorter than a predetermined threshold, then the CFE 200 executes the first several control steps using control logic located within the CFE block 200, and simultaneously issues the command to a parallel functional unit and initializes that unit. Subsequently, the control action sequence is seamlessly taken over by the selected command sequencer which recognizes (based on the latency value accompanying the command) that the CFE 200 has already performed the initial control actions. The selected command sequencer therefore skips performing these actions which it would normally do, and instead proceeds directly to execute the remaining control actions necessary to process the command. For example, if a page read command is dispatched by the system's command module 150, the CFE 200 within a particular SLDRAM recognizes this command as a special case if the page read latency register located in the SLDRAM device was programmed to the minimum value by a previous command. When this occurs, special logic in the CFE 200 performs the first two control actions for a page read (column open (select) for the low array, and initiation of a read operation within the data output path) simultaneously with issuing the command to an idle sequencer. The sequencer itself is designed to recognize the special case of a minimum latency page read and will skip the first two control steps performed by the special logic in the CFE 200 and instead directly proceed to the remaining instructions to complete the page read command.

Figure 5A:
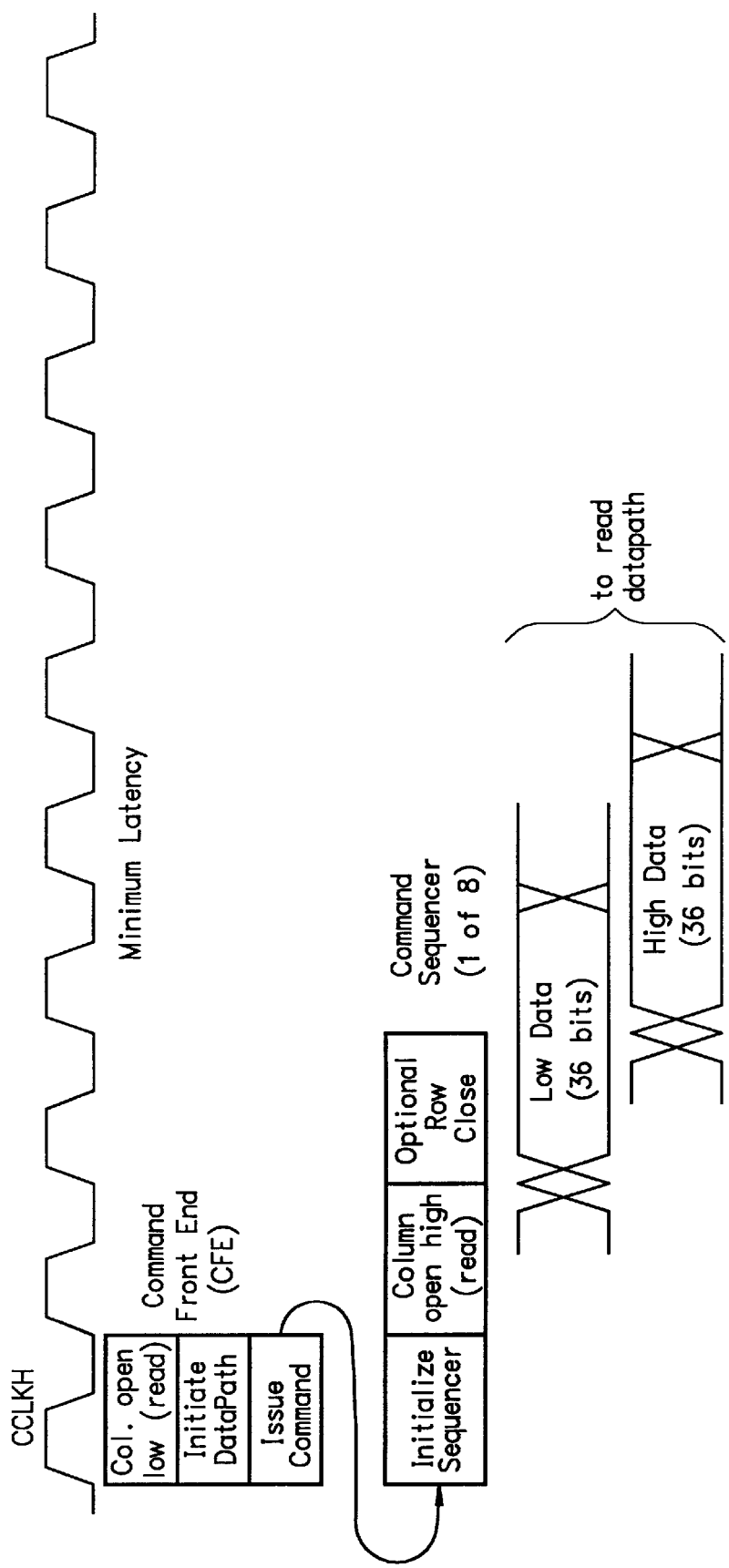
FIG. 5A is a conceptual diagram illustrating the processing of a minimum latency page read command.

FIG. 5A illustrates the relative timing of processing of a minimum latency page read operation by the CFE 200 and a selected command sequencer. Upon a predetermined rising edge of the command clock, CCLKH, the CFE opens a selected column, initiates the data path (precharging and equalizing of data buses) and issues the page read command to the available sequencer, all within the first CCLK period. Then, during a subsequent CCLK period, the command sequencer opens a second column, column high (previously column low was opened) to initiate the read of the second column. Prior to the end of this subsequent clock cycle, the read data path begins to receive the low data bits corresponding to the low column which was opened by the CFE in the first CCLK cycle. Subsequently, after some delay, the read data path receives the high data bits corresponding to the high column which was opened by the sequencer, as described above. In this fashion, the labour (reading column low and column high) was divided between the CFE and a selected sequencer by having the CFE perform the first portion of the operation, and the sequencer perform the remaining portion of the operation.

If on the other hand, the desired latency is determined to be greater than a predetermined threshold i.e. if the actual page read latency register is programmed to a value greater than the minimum latency, then the CFE 200 executes none of the control actions and instead forwards them all to an available command sequencer. In this case, the selected sequencer also recognizes that the page read latency is greater than minimum and performs all control actions to accomplish the page read (after inserting any necessary wait states).

Figure 5B:
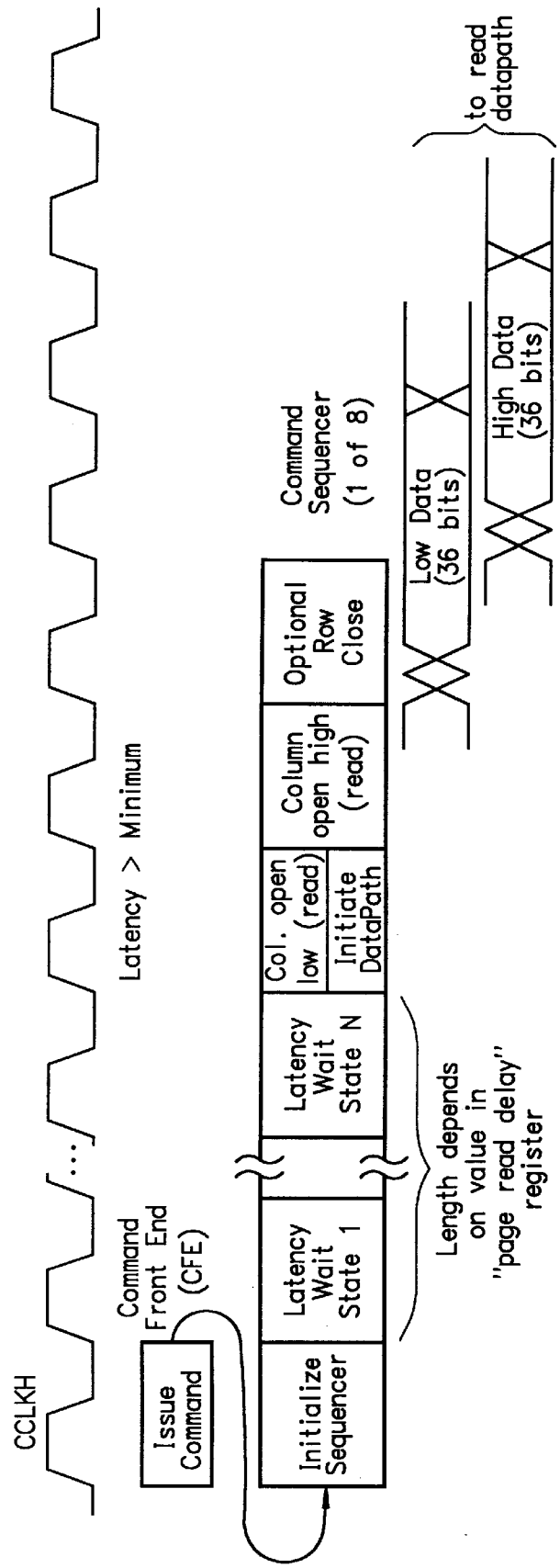
FIG. 5B is a conceptual diagram illustrating the processing of a non-minimum latency page read command.

FIG. 5B illustrates the relative timing of processing of a non-minimum latency page read operation by the CFE 200 and a selected command sequencer. Upon a predetermined rising edge of the command clock, CCLKH, the CFE 200 recognizes that the requested command is a non- minimum latency command by the value written into the latency register, and immediately issues the command to an available command sequencer within the first CCLK period. The selected sequencer is initialized and a number of latency states are inserted depending on the value in the page read delay register. Once the latency wait states have elapsed, the sequencer proceeds to execute the command in a manner similar to that described in FIG. 5A, i.e. a column open low is performed along with the initialization of the data path. Subsequently, a column open high read operation is performed during the second clock cycle and during that same cycle, low data starts to appear on the read data path. Finally, an optional row close command is executed during the third clock cycle and the high data appears on the read data path. By optionally performing the initial page read control actions simultaneously with the issuing of the page read command to an idle sequencer, the minimum page read latency is reduced by one clock cycle.

Figure 6:
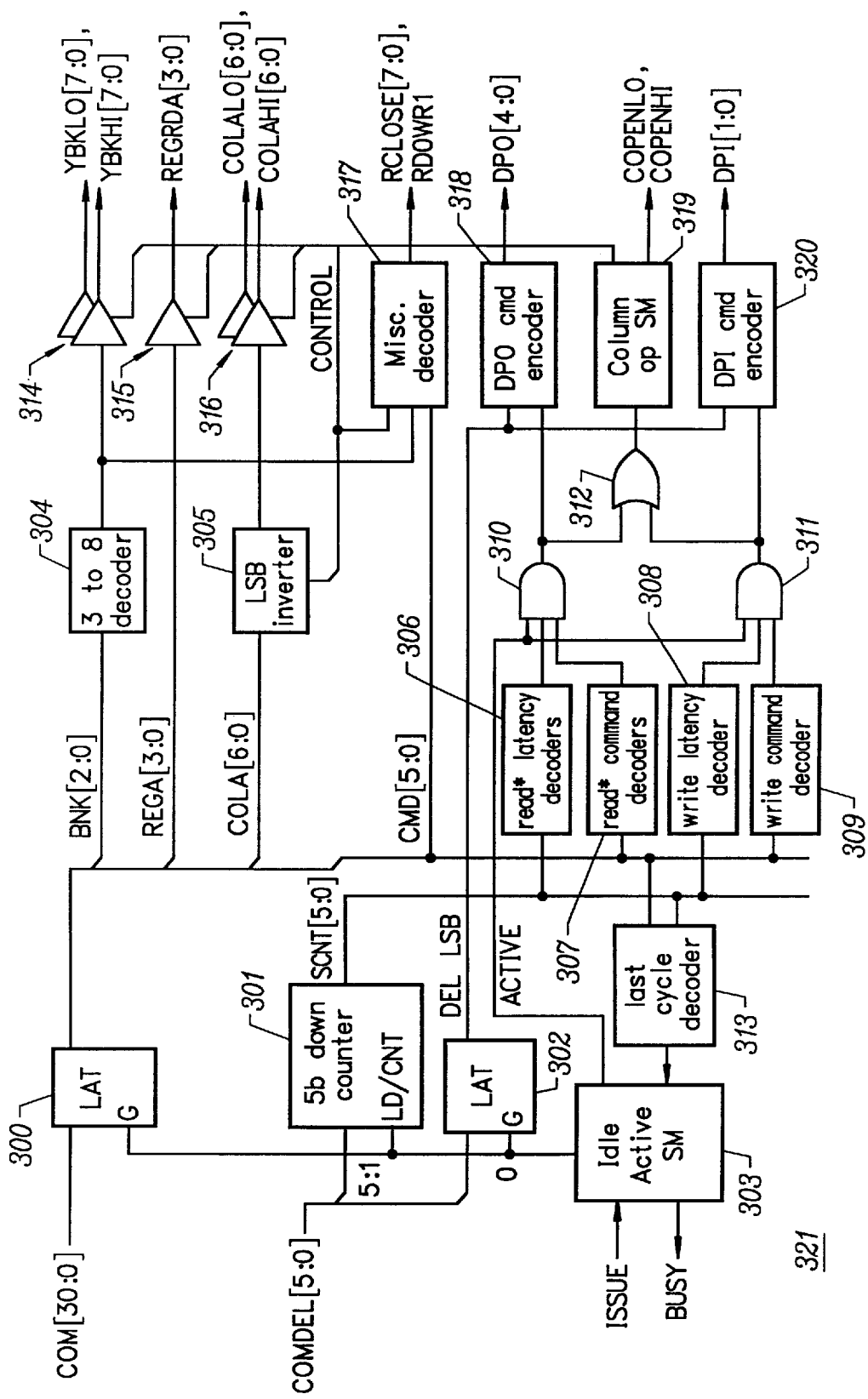
FIG. 6 is a block diagram of a command sequencer according to an embodiment of the invention.

In general, the CFE block 200 has the following procedure for receiving and processing a command:
Assemble a 40-bit command packet when FLAG is asserted
Compare packet ID with the device ID in order to determine whether packet is heading to correct device
Decode 6-bit command field to:
Determine the command type (buffered, immediate, etc.)
Determine command latency
Issue command if all the following conditions are satisfied:
Command field contains a valid opcode
Command ID matches device ID
FLAG protocol is obeyed, i.e. FLAG bit is asserted for one clock tick only (i.e. half a period)
Command processing mode is enabled
An idle command sequencer is available FIG. 6 illustrates a command sequencer 321 corresponding with one of the command sequencers 201–208 in FIG. 4, according to an embodiment of the invention. The command signals COM[30:0] are received by a latch 300 which is enabled by a signal G from a Idle/Active module select block 303 (for a more detailed breakdown of the command packet, see Table 2.0 in the above-incorporated patent application). The output of the latch 300 is broken down into bank address signals BNK[2:0], register address signals REGA[3:0], column address signals COLA[6:0] and the actual command instructions CMD[5:0]. The BNK[2:0] signals are decoded by a 3-to-8 decoder 304 and then fed into output buffers 314 for high and low column block addresses signals YBKLO[7:0] and YBKHI[7:0], as well as being input into a miscellaneous decoder 317 for closing an open row RCLOSE[7:0]. The register addresses REGA[3:0] are output via buffers 315, while the column addresses COLA[6:0] are latched and then output via buffers 316; the LSB COLA[0] is optionally inverted by an LSB inverter 305 for performing the second half of the word burst operation. The misc. decoder 317 also receives the command instruction signals CMD[5:0] as inputs. The required command latency delay is input into the sequencer via lines COMDEL [5:1] into a 5-bit counter 301 and with the least significant bit COMDEL0 input into a latch 302. The counter and latch 301 and 302 respectively, also receive the G control signal from the Idle/Active module select block 303. The output of the counter 301 feeds into read latency decoders 360, read command decoders 307, write latency decoders 308 and write command decoder 309. If the sequencer is available, the Idle/Active module select block 303 generates and asserts an ACTIVE signal in response to an asserted ISSUE signal from the CFE. The ACTIVE signal in turn enables the decoder combining circuitry, AND gates 310 and 311. OR gate 312 selects between read and write command decoder outputs from 310 or 311 respectively to initiate a column operation via block 319. The column operation block 319 also produces a control signal which is used to control the buffers 314, 315 and 316, and also produces the output the control signals COLENLO, COLENHI for internally enabling the selected columns within the device. If a read command is decoded along with its corresponding latency via 306, 307 and 310, a data output path command encoder 318 is used to generate the data path output control signals DPO[4:0]. If a write command is decoded along with its corresponding latency via 308, 309 and 311, a data input path command encoder 320 is used to generate the data path input control signals DPI[4:0]. The data path output and input command decoders 318 and 320 are also controlled by the LSB from latch 302.

The sequencer 321 is one of eight identical functional units 201-208 as illustrated in FIG. 4. There is no interlocking between the sequencers or between a particular sequencer and the CFE 200. Therefore, the command module (memory controller) must be aware of the actual delay values and schedule commands appropriately.

The sequencer performs any one the following operations:

all bank read/write commands except for row open which is performed by the command front end CFE all page read commands unless actual delay is programmed to minimum, in which case the CFE performs the data path initiate and part of the column open all register read and read synch commands unless page read actual delay is programmed to minimum, in which case the CFE performs the data path initiate As a further clarification as to the Division of Labour between the CFE and the command sequencers, Tables 1A, 1B and 1C are included below. These tables set forth the memory control steps performed by the CFE or by a sequencer, as the case may be, in response to a received command. As used herein, a "memory control step" is a step which drives the operation of a DRAM bank in a desired manner. The memory control steps set forth in Tables 1A, 1B and 1C are illustrative ones of such steps which are used in the present embodiment.

TABLE 1A

Division of Labor - Read Operations

| Command | Command Front End Memory Control Steps | Sequencer Memory Control Steps |
|---|---|---|
| Read Page (BURST4)** | If latency = minimum<br>• open column low, initiate DPO transfer<br>issue command to sequencer | If latency > minimum<br>• insert necessary wait states<br>• open column low, initiate DPO transfer<br>open column high<br>optional precharge |
| Read Page (BURST8)*** | If latency = minimum<br>• open column low, initiate DPO transfer<br>issue command to sequencer | If latency > minimum<br>• insert necessary wait states<br>• open column low, initiate DPO transfer<br>open column high<br>open column low*, initiate DPO transfer<br>open column high*<br>optional precharge |
| Read Bank (BURST4) | open row<br>issue command to sequencer | insert necessary wait states<br>open column low, initiate DPO transfer<br>open column high<br>optional precharge |
| Read Bank (BURST8) | open row<br>issue command to sequencer | insert necessary wait states<br>open column low, initiate DPO transfer<br>open column high<br>open column low*, initiate DPO transfer<br>open column high*<br>optional precharge |

*LSB of column address is complemented.
**BURST4 refers to a burst of 4 consecutive 18-bit data words.
***BURST8 refers to a bust of 8 consecutive 18-bit data words.

TABLE 1B

Division of Labor - Write Operations

| Command | Command Front End Memory Control Steps | Sequencer Memory Control Steps |
|---|---|---|
| Write Page (BURST4) | • issure command to sequencer | • insert necessary wait states<br>• initiate DPI transfer<br>• open column low<br>• open column high<br>• optional precharge |
| Write Page (BURST8) | • issue command to sequencer | • insert necessary wait states<br>• initiate DPI transfer<br>• open column low<br>• open column high, initiate DPI transfer<br>• open column low*<br>• open column high*<br>• optional precharge |
| Write Bank (BURST4) | • open row<br>• issue command to sequencer | • insert necessary wait states<br>• initiate DPI transfer<br>• open column low<br>• open column high<br>• optional precharge |
| Write Bank (BURST8) | • open row<br>• issue command to sequencer | • insert necessary wait states<br>• initiate DPI transfer<br>• open column low<br>• open column high, initiate DPI transfer<br>• open column low*<br>• open column high*<br>• optional precharge |

*LSB of column address is complemented

TABLE 1C

Event Operations

| Command | Command Front End Memory Control Steps | Sequencer Memory Control Steps |
|---|---|---|
| Read Register | If latency = minimum<br>• initiate DPO transfer (register)<br>issue command to sequencer | If latency > minimum<br>• insert necessary wait states<br>• initiate DPO transfer (register)<br>drive address to register selection MUX |
| Read Sync | If latency = minimum<br>• initiate DPO read sync<br>issue command to sequencer | If latency > minimum<br>• insert necessary wait states<br>• initiate DPO read sync |
| Row Open | open row | |
| Row Close | close row | |
| Register Write,<br>Event, Stop<br>Read Sync,<br>Drive DCLKs,<br>Disable DCLKs | issue command to immediate command block | |

In general, the command sequencers perform bank read and writes, page writes and all the rest of operations with a programmable latency which is not set to a minimum value. It will be appreciated that the CFE and the sequencers never perform the same control step at the same time, the memory controller being responsible for scheduling instructions in such a way that the CFE and sequencers will not be generating control signals which create contention on the CTL/ADDR bus of FIG. 4. Similarly, the memory controller is responsible for ensuring that the parallel sequencers do not create contention. Note that two parallel sequencers can operate simultaneously and still not create contention if, for example, they are generating control signals for different banks of memory controlled by different signal lines.

The command pipeline described above gives rise to one timing outcome which must be compensated. Namely, since command latencies are programmed in increments of clock "ticks" i.e. half clock cycles, and the command pipeline operates with a full clock period (i.e. 2 ticks), for latencies requiring an odd number of delays, a mismatch arises between the latency ticks and the command clock period, since the command pipeline cannot insert the appropriate number of tick delays based solely on its clock period. For an even number of delays, there is no mismatch between the number of delays required and the command pipeline clock period. As a result, a method for inserting an additional tick delay for odd-numbered latencies is implemented in a preferred embodiment of the invention, as will be discussed below.

More generally, in order to generate control signals with timing resolution Tre, using conventional synchronous logic design techniques, it is necessary to clock the logic with a clock period shorter than or equal to $T_{res}$. For a high timing resolution system (i.e. short $T_{res}$), this requires a high operating frequency for the control logic, resulting in relatively high power consumption, especially in CMOS implementations due to the $CV^2f$ term, and also resulting in the minimum timing resolution $T_{res}$ being limited by the maximum operation frequency of the synchronous control logic. Conventional approaches to resolving this issue included simply designing the control logic to operate at the frequency necessary for the desired timing resolution $T_{res}$ by use of an increased control pipeline depth or the use of special circuit level design techniques such as dynamic storage elements to achieve the desired frequency/resolution. However, as the operating frequencies have increased, simply forcing the control logic by design to operate at those frequencies is becoming more and more challenging.

According to a preferred embodiment of the invention, a half-period adjust scheme is implemented to address this timing resolution drawback. The control logic is designed to operate with a clock period that is an integral multiple N of the desired timing resolution $T_{res}$, i.e., the control logic operates with clock period $T_{cp}=N \times T_{res}$. As a result, control signal timing is represented in terms of an integral number P of $T_{cp}$ clock periods plus a fraction F/N where F is an integer between 0 and N−1, $t_{cs}=(P+F/N) \times T_{cp}$. The implementation of the control logic to handle this timing is as follows:

1) Store the parameter F while using P to count out the desired number of clock periods.
2) Upon completion of P synchronous counting steps, use the parameter F to generate the output signal delayed from the logic clock by $(F/N) \times T_{cp}$.

One possible implementation is to use the parameter F to control the insertion of appropriately scaled delay elements within the signal path of the output control signal. An alternate implementation is to pass the parameter F to the functional logic being controlled for the delay to be effected there.

Specifically, with respect to the command processing described earlier, with command latencies programmed in ticks, and the command pipeline operating with a full clock period, (in this case 5 ns.) the half-clock adjust solution according to the preferred embodiment of the invention consists of implementing the latency within the command pipeline to within the nearest clock count, or effectively dividing the tick count by two, and then adjusting for the final fraction portion according to the number of tick delays required by the latency. In the case of an even tick count latency, the resulting tick count implemented in the command pipeline is equivalent to the tick count programmed. For an odd tick count latency delay, the command pipeline delay ends up being early by a half a clock period. In order to compensate for this effect, the command is flagged as requiring a "half-period adjustment" and the data path introduces an extra half clock delay.

Figure 7:
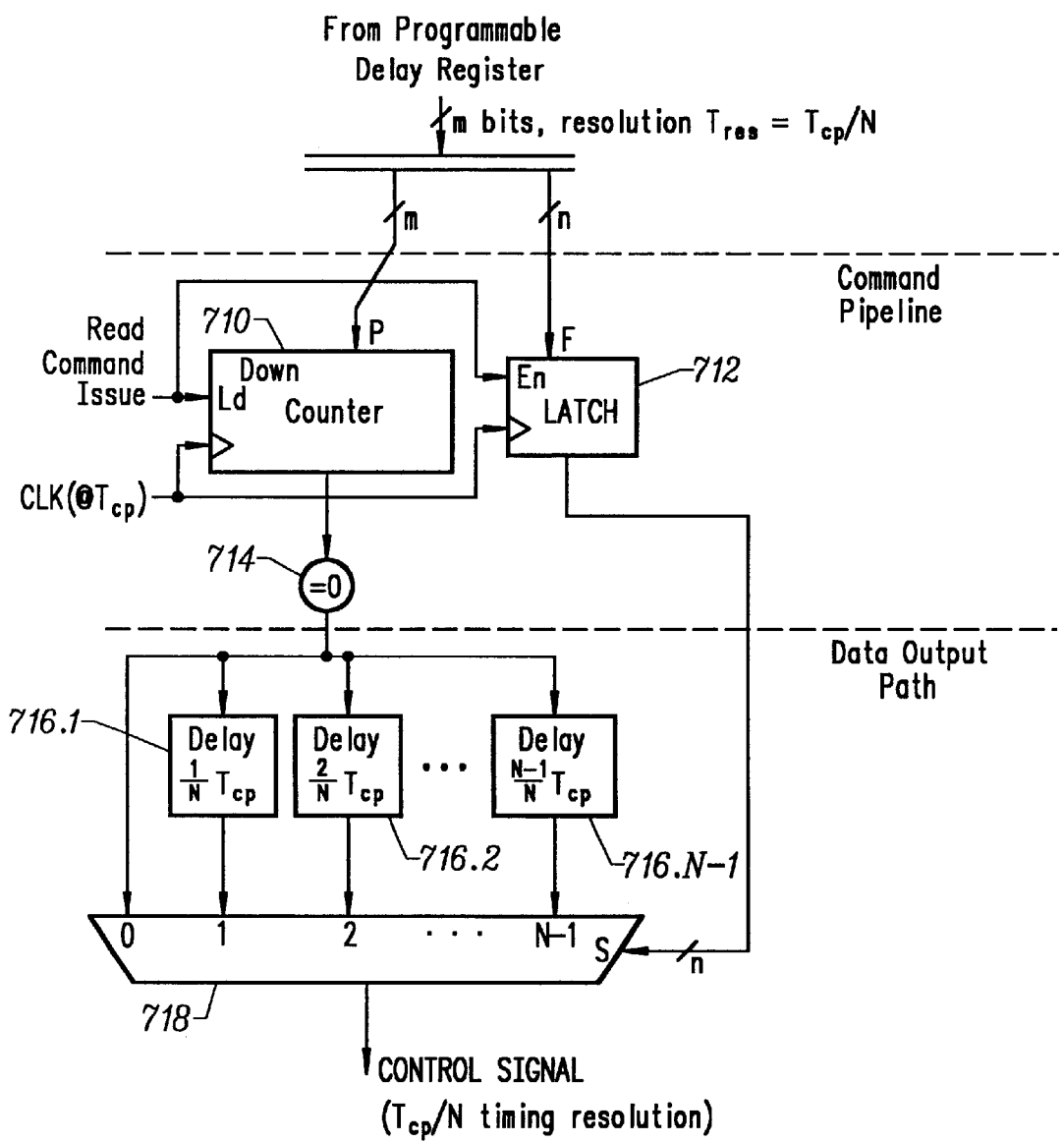
FIG. 7 is a block diagram of a control signal variable delay circuit with a delay resolution shorter than one clock period.

FIG. 7 illustrates a general implementation of this aspect of the invention. A latency value is input along with a command and stored in a latency register, in this case a 6-bit unsigned value. For a read operation for example, the read latency associated with the read operation is processed as follows:

1) the control logic takes the upper 5 bits of the latency value and inserts that number of 5 ns wait states within the command pipeline;
2) the least significant bit of the programmed latency value is passed along through the command pipeline as the "half clock adjust bit". When the wait states inserted in the command pipeline are completed the control logic asserts a control signal to the data output path logic along with the half clock adjust bit. If the half clock adjust bit is logic 1, then the data path further delays the read data by 2.5 ns, alternately, if the half clock adjust bit is logic 0, then the data path does not insert any additional delay.

In general, the half period adjust scheme can be extended as follows. For a system with desired timing resolution $T_{res}$, the control pipeline can be clocked with a clock with a period $T_{cp}$, that is an integral multiple N that is a power of two times $T_{res}$, i.e. , $T_{cp}=N \times T_{res}$, $N=2^n$. Referring to FIG. 7, a timing parameter is then represented as a binary M-bit fixed point value with the least significant n bits as a fraction of the $T_{cp}$ clock period.

The m timing parameter bits above the least significant n bits specify the synchronous logic delay count P. These bits are loaded into a down counter 710. The least significant n bits carry the fractional delay value F, and are loaded into a latch 712 for temporary storage. After the down counter 710 counts down P clock pulses, a zero detector 714 asserts the desired control signal. This control signal is provided to N−1 delay elements 716.1, 716.2, . . . , 716.N−1 (collectively 716), which delay the control signal by respective amounts 1/N $T_{cp}$, 2/N $T_{cp}$ and (N−1)/N $T_{cp}$. The control signal is also provided to one input of a multiplexer 718, as are the outputs of each of the delay elements. The n low order bits of the delay value are provided from the latch 712 to the select input of multiplexer 718. Thus the control signal, already delayed by P clock periods $T_{cp}$ by the counter 710, is then further delayed by the specified fractional part F/N of a clock period by the delay elements 716 and multiplexer 718.

In the embodiment described herein, M=6, m=5, n=1, and N=2. In this case the control pipeline is clocked with the clock period $T_{cp}$ which is N=2 times the desired timing resolution $T_{res}$. The least significant n=1 bit of the timing value is therefore used to control a 2-to-1 multiplexer 718 to select the synchronous pipeline output signal delayed by 0 or ½ $T_{cp}$ as the control signal output by the control logic. In another example, with n=3, the control pipeline is clocked with the clock period $T_{cp}$ which is N=8 times the desired timing resolution $T_{res}$. The least significant 3 bits of a timing value are therefore used to control an 8-to-1 multiplexer 718 to select the synchronous pipeline output signal delayed by 0, ⅛ $T_{cp}$, 2/8 $T_{cp}$, 3/8 $T_{cp}$, 4/8 $T_{cp}$, 5/8 $T_{cp}$, 6/8 $T_{cp}$, or 7/8 $T_{cp}$ as the control signal output by the control logic.

Note that other implementations are possible within the scope of this aspect of the invention. For example, the delay elements 716 could be replaced if desired by a single delay line having N−1 taps. As another example, the delay elements 716 and the multiplexer 718 in combination could be replaced by a single variable delay element. Other variations will be apparent.

Contention-Free Signaling Scheme

As shown in FIG. 4, many of the CTL/ADDR leads that are driven by the CFE 200 or any of the command sequencers 201–208 are shared. Thus at different times they might be driven by different controlling units. As mentioned above, the memory controller is responsible for ensuring, through proper scheduling of memory control steps, that no two of the controlling units assert signals on the same control line in the same clock pulse. Though not required in different embodiments, the memory module of the present embodiment uses a transition-based contention-free signaling scheme in order to achieve enhanced contention-free operation.

Figure 8:
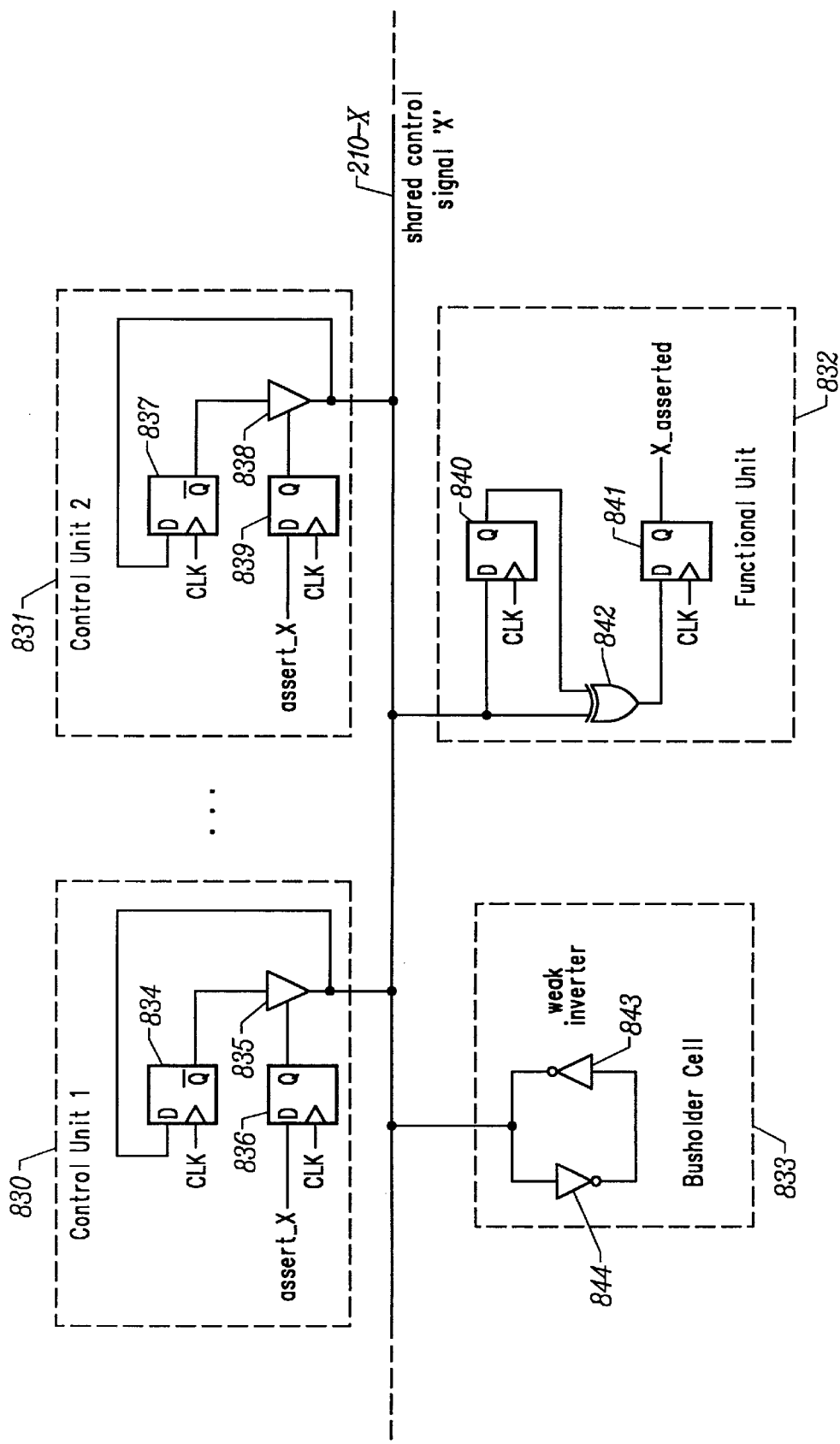
FIG. 8 is a block diagram illustrating input and output circuits connected to shared bus signal lines CTL/ADDR in FIG. 4.

FIG. 8 is a block diagram illustrating the circuits connected immediately to one of the shared control lines 210-X. Control units 830 and 831 represent two units from the group consisting of the CFE 200 and the command sequencers 201–208, any of which can drive the control line 210-X. Functional unit 832 represents any of the functional units which receive commands from the shared bus, such as DRAM banks and data paths in and out. The bus holder cell 833 could be physically part of any of the control units or functional units, or could be physically a separate cell as shown in FIG. 8. The function of the bus holder cell 833 is described below.

FIG. 8 shows the output driver portion of the control units 830 and 831. Referring to control unit 830, the output driver comprises two D-type flip/flops 836 and 834 as well as a tri-state buffer 835. Flip-flop 836 receives a command "assert-X", at its D-input and the system clock CLK at its clock input and outputs, on its Q output, a control signal to enable the tri-state buffer 835.

Flip/flop 834 receives the output of the tri-state buffer 835 at its D-input and CLK on its clock input and outputs its Q\ ("Q-not") output to the input of the tri-state buffer 835. The resulting output signal from control unit 830 is therefore the output of the tri-state buffer 835. A similar output driver structure exists for control unit 831 as illustrated in FIG. 8.

The bus holder cell 833 consists of two cross-coupled inverters 843 and 844 which essentially act as a shared SRAM (static random access memory) bit storing the most recently asserted value on control signal line 210-X, until overwritten. The output of each inverter is connected to the input of the other, and the output of inverter 843 (input of inverter 844) is connected to the shared signal line 210-X. The inverter 843 is designed with weak driving characteristics so it can be easily overcome with an opposite polarity signal driven onto the shared control line 210-X by one of the control units 830 or 831.

The input portion of functional unit 832 comprises two D-type flip/flops 840 and 841 and an exclusive OR (XOR) gate 842. Shared control signal 210-X is input into one of the inputs of the XOR gate 842 as well as to the D-input of flip/flop 840, which in turn is clocked by the system clock CLK. The Q output of flip/flop 840 is input as the second input to the XOR gate 842, which then outputs to the D-input of flip/flop 841. The Q output of flip/flop 841 represents an "asserted-X" control signal within the functional unit which is used to implement some control operation in the functional unit 832.

Figure 9:
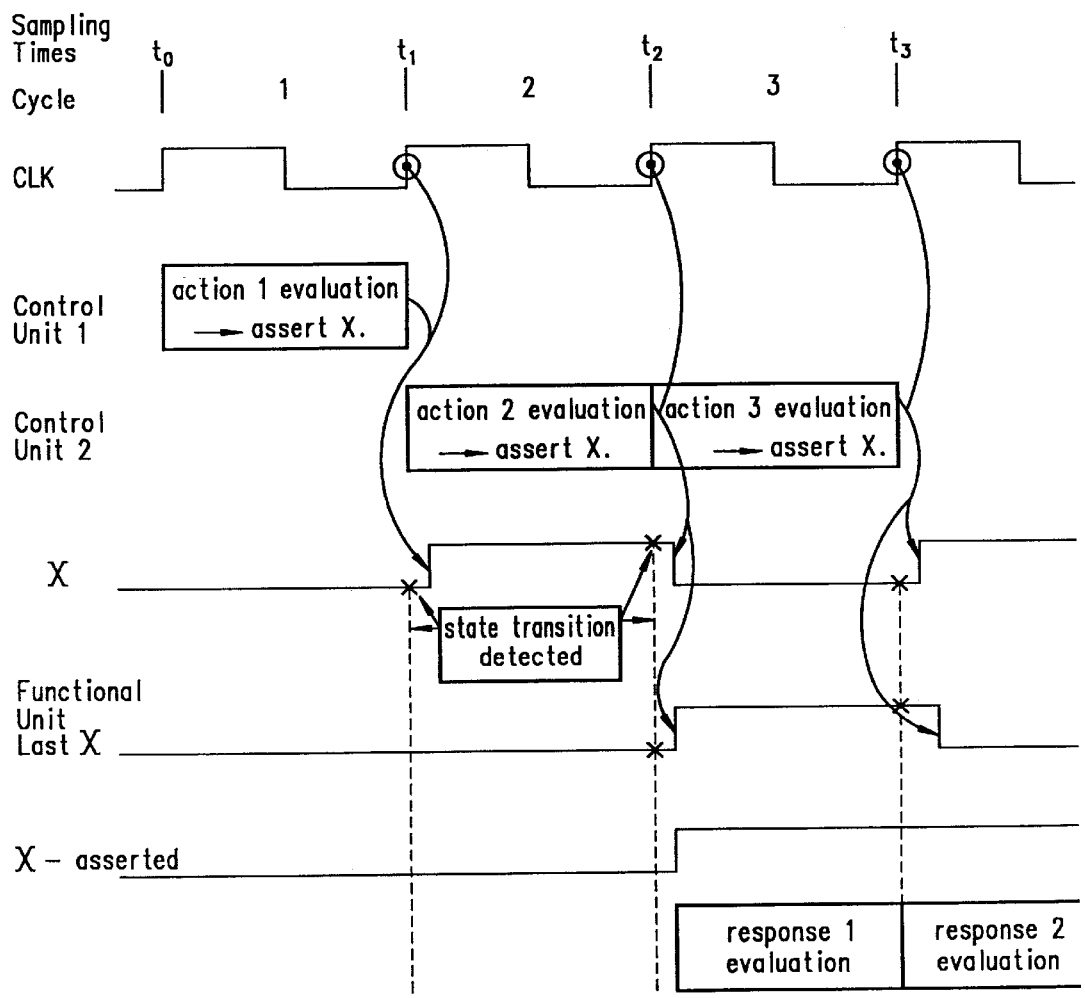
FIG. 9 is a timing diagram illustrating the operation of the circuits of FIG. 8.

FIG. 9 is a timing diagram illustrating the operation of the circuits of FIG. 8. Referring to FIG. 9, prior to an arbitrary system clock cycle, cycle 1 for example, initiated at sampling time $t_0$ control unit 830 evaluates a command and decides to assert the corresponding control signal onto the shared control signal line 210-X. Since this is a fully synchronous system, control unit 830 will assert is request and upon the next rising edge of CLK at time $t_1$, and after a short time delay, the control signal 210-X will experience a transition in its logic state from a logic low to a logic high (note that prior to this change, at sampling time $t_1$, the shared control signal 210-X had a logic low value). The state of control signal 210-X is maintained by the bus holder cell 833 for the duration of cycle 1 until it is overwritten in the next cycle. At the end of cycle 1 and the beginning of cycle 2, control unit 831 evaluates a command action and chooses to assert X. At the end of cycle 2, demarcated by sampling time $t_2$, the shared control signal 210-X is still logic high, and therefore a state transition is detected by the functional unit 832. The D-flip/flop 840 stores the last 210-X value (output of 840) and the XOR gate 842 compares the current value of 210-X and last 210-X. Since at $t_2$, 210-X is logic high and last 210-X is logic low, the X- asserted output of D-flip/flop 841 is made logic high by the XOR gate 842 on the rising clock edge. The functional unit 832 then proceeds to execute the control steps associated with the X-asserted control signal (not shown) Subsequently, during a third clock cycle, cycle 3, control unit 831 decides to continue to assert X. At time $t_3$, the functional unit 832 samples the shared signal 210-X and finds it to be logic low, thereby indicating another state transition since sampling time $t_2$. Since the command to continue to assert X was provided during cycle 3, 210-X will again change states after sampling time $t_3$, and the last 210-X in the functional unit D-flip/flop 840 will also change states. However, since both 210-X and last 210-X still remain opposite in phase, the X-asserted output remains logic high, through the XOR action of 842. As can be seen from FIG. 9, three clock cycles are required between the time when an action is evaluated by a controlling unit and the time when an asserted control signal results in the functional unit. Also, from FIG. 9, it can be seen that the two controlling units used to illustrate the operation, units 830 and 831 did not have to contend for the control signal 210-X bus over consecutive clock cycles. The system can continue to operate in this fashion with alternating control between control units on every clock cycle.

Alternate Embodiments and Applications

As higher clock frequencies will be required in future applications, deeper pipelining will also be required, and according to an embodiment of the invention, two or more clock cycles of control activity are selectively moved up into the command front end based on early or partial decoding of certain commands. For example, consider a case where commands require 4 consecutive pipeline stages D1, D2, D3 and D4 to completely capture, decode and issue to a parallel function unit (sequencer), illustrated in Table 2. The commands themselves take control actions C1, C2, and C3 in three consecutive clock cycles to perform. Without the division of the commands between the CFE and a selected sequencer, the minimum control latency is five clocks as shown below in Table 2.

TABLE 2 programmed latency = minimum (5)

| | 0 | 1 | 2 | 3 | 4 | 5 | 6 | 7 |
|---|---|---|---|---|---|---|---|---|
| Command Decoder | | D1 | D2 | D3 | D4 | | | |
| | | | | | | command issue | | |
| Functional Unit | | | | | | → | C1 C2 C3 | |
| | ↑ | | | | | ↑ | | |
| | Command Received | | | | | First control action | | |

In this system the minimum control latency is five cycles and programmed latencies greater than this are performed by the sequencer inserting wait states between command issue and the control sequence C1, C2, and C3. If sufficient knowledge is known about the command (including the associated programmed latency) by decode stage D3, it is possible to reduce the minimum control latency by two cycles by allowing the command decoder to optionally perform control actions C1 and C2. This is shown below in Table 3.

TABLE 3 programmed latency = minimum (3)

| | 0 | 1 | 2 | 3 | 4 | 5 | 6 | 7 |
|---|---|---|---|---|---|---|---|---|
| Command Decoder | | D1 | D2 | D3 | D4 | | | |
| | | | | C1 | C2 | | | |
| | | | | | command issue | | | |
| Functional Unit | | | | | → | C3 C4 | | |
| | ↑ | | | | ↑ | | | |
| | Command Received | | | | First control action | | | |

TABLE 4 programmed latency = minimum + 1 (4)

| | 0 | 1 | 2 | 3 | 4 | 5 | 6 | 7 |
|---|---|---|---|---|---|---|---|---|
| Command Decoder | | D1 | D2 | D3 | D4 | | | |
| | | | | | C1 | | | |
| | | | | | command issue | | | |
| Functional Unit | | | | | → | C2 C3 C4 | | |
| | ↑ | | | | ↑ | | | |
| | Command Received | | | | First control action | | | |

TABLE 5 programmed latency = minimum + 2 (5)

|   | 0 | 1 | 2 | 3 | 4 | 5 | 6 | 7 | 8 |
|---|---|---|---|---|---|---|---|---|---|
| Command Decoder | | D1 | D2 | D3 | D4 | | | | |
| Functional Unit | | | | | | ↳ C1 | C2 | C3 | C4 |
| | ↑ | | | | | ↑ | | | |
| | Command Received | | | | First control action | | | | |

(command issue arrow points to C1)

It is also possible to incorporate the an embodiment of the invention within a control system with only a single functional unit. In that case, command processing is broken down into a front end block which performs command decoding and issues commands to a single back end block that executes control actions. The decomposition of the control system into two parts therefore allows parallelism even with a single functional unit because the back end block can perform the control actions for command N even as the front end decoder processes command N+1. The invention may be applied as in the case of multiple functional units to reduce minimum control latency.

In general, this invention may be used in any application where it is important to reduce the minimum latency within a control system processing a stream of commands or instructions where the control actions for two or more separate commands may overlap in time and control latency is programmable. These include high speed pipelined interchip communications interfaces, packet based network routing and bridging equipment, specialized data processing and digital signal processing systems, and control and stimulus generation within automated test equipment (ATE).

The improvements attained through the implementation of the present invention include a reduction in the minimum control action latency compared to the conventional scheme with a front end decoder unit issuing commands to multiple parallel functional units and implementation of all control actions within the parallel functional units while achieving the same minimum latency as an aggressive implementation with replicated command decoding logic in each parallel functional unit while avoiding most of its extra complexity and power consumption relative to the conventional scheme.

With respect to the general implementation of the half period adjust scheme, the proposed solution can be used for any application where digital control signals must be generated with a timing resolution too small to be practical or desirable for conventional synchronous control logic with timing resolution equal to the clock period.

This could include high speed interchip communication schemes, output waveform shaping circuits, programmable time base generators, automated test equipment (ATE), direct digital synthesis (DDS) signal generators, and high frequency signal modulation.

The above disclosure is to be taken as illustrative of the invention, not as limiting its scope or spirit. Numerous modifications and variations will become apparent to those skilled in the art after studying the above disclosure. For example, apparatus according to the invention need not issue commands to a sequencer exactly simultaneously with the performance of the first memory control step(s). It is sufficient for the apparatus to issue the command "substantially" simultaneously with the performance of the first memory control step(s), such as within one clock cycle.

As used herein, a given signal or event is "responsive" to, or "depends upon", a predecessor signal or event if the predecessor signal or event influenced the given signal or event. If there is an intervening processing element or time period, the given event or signal can still be "responsive" to, or "dependent upon", the predecessor signal or event. If the intervening processing element combines more than one signal or event, the signal output of the processing element is considered "responsive" to, or "dependent upon", each of the signal or event inputs. If the given signal or event is the same as the predecessor signal or event, this is merely a degenerate case in which the given signal or event is still considered to be "responsive" to, or "dependent upon", the predecessor signal or event.

Given the above disclosure of general concepts and specific embodiments, the scope of protections sought is to be defined by the claims appended hereto.

What is claimed is:

1. A memory system having a plurality of memories each having a command decoder front end receiving incoming command packets, and a set of at least one command sequencer,
    wherein said command decoder front end has facilities for (1) at least partially decoding incoming command packets, (2) issuing commands to at least one sequencer in said set of command sequencers in response to said incoming command packets, and (3) performing a first group of at least one memory control step of a decoded command in response to said incoming command packets,
    and wherein each of said command sequencers has facilities for performing a second group of memory control steps of decoded commands issued to the command sequencer from the command decoder front end.

2. A system according to claim 1, wherein said command decoder front end further has facilities for assembling each of said incoming command packets from a respective plurality of consecutive incoming command words.

3. A system according to claim 1, wherein said command decoder front end further has facilities for determining whether or not to perform said first group of memory control steps for a given incoming command packet.

4. A system according to claim 1, wherein each of said incoming command packets has associated therewith a respective desired latency value, and wherein said command decoder front end further has facilities for performing said first group of memory control steps for a given incoming command packet only if the desired latency value associated with said given command packet is below a predetermined threshold latency value.

5. A system according to claim 4, wherein each of said command sequencers further has facilities for performing said first group of memory control steps for said given incoming command packet, if said command decoder front end does not perform said first group of memory control steps for said given incoming command.

6. A system according to claim 4, wherein said incoming command packets include a command type indicator, and wherein said command decoder front end includes facilities to determine the desired latency value for the given command packet in dependence upon the command type indicator in the given command packet.

7. A system according to claim 1, wherein the facilities of said command decoder front end for issuing commands to at least one sequencer in response to said incoming command packets, issues such commands for a given incoming command packet substantially simultaneously with the performance by said command decoder front end of a memory control step for said given incoming command packet.

8. A method for managing a memory system, for use with an incoming command packet, comprising the steps of:
receiving said incoming command packet in a command decoder front end;
said command decoder front end decoding said command packet, issuing a command to a first command sequencer in response to said command packet, and further performing a first group of at least one memory control step in response to said incoming command packet; and
said first command sequencer performing a second group of at least one memory control step in response to receipt of said command from said command decoder front end.

9. A method according to claim 8, further comprising the step of assembling said command packet from a plurality of consecutive incoming command words.

10. A method according to claim 8, further comprising the step of said first command sequencer determining that said first group of memory control steps, are performed by said command decoder front end,
further comprising the step of said first command sequencer abstaining from performing said first group of memory control steps in response to said step of determining.

11. A method according to claim 8, wherein said step of said command decoder front end issuing a command to a first command sequencer in response to said incoming command packet occurs substantially simultaneously with the step of said command decoder front end performing a first group of at least one memory control step in response to said incoming command packet.

12. A method according to claim 8, further comprising the steps of:
said command decoder front end further indicating a latency value to said first command sequencer in conjunction with said step of said command decoder issuing a command to a first command sequencer; and
said first command sequencer inserting at least one latency wait state in dependence upon said latency value indicated by said command decoder front end, after receipt of said command from said command decoder front end and prior to said step of performing a second group of at least one memory control step.

13. A method according to claim 8, further comprising the step of said command decoder front end selecting said first command sequencer from among a plurality of parallel command sequencers in response to receipt of said command packet.

14. A method for managing a memory system, for use with a first incoming command packet, comprising the steps of:
receiving said first incoming command packet in a command decoder front end;
said command decoder front end decoding said first command packet, issuing a command to a first command sequencer in response to said first command packet, and determining whether to perform a first group of at least one memory control step in response to said first command packet; and
said first command sequencer performing a second group of at least one memory control step in response to receipt of said command from said command decoder front end.

15. A method according to claim 14, further comprising the step of assembling said command packet from a plurality of consecutive incoming command words.

16. A method according to claim 14, wherein said command decoder front end determines to perform said first group of memory control steps, further comprising the step of said command decoder front end performing said first group of memory control steps in response to said first command packet,
wherein said second group of memory control steps excludes said first group of memory control steps.

17. A method according to claim 16, wherein said step of said command decoder front end issuing a command to a first command sequencer in response to said first command packet occurs substantially simultaneously with said step of said command decoder front end performing said first group of memory control steps in response to said first command packet.

18. A method according to claim 14, wherein each of said incoming command packets has associated therewith a respective desired latency value, and wherein said command decoder front end performs said step of determining whether to perform said first group of memory control steps in response to a determination of whether the desired latency value associated with said first command packet is below a predetermined threshold latency value.

19. A method according to claim 18, wherein said command decoder front end determines that the desired latency value associated with said first command packet is below said predetermined threshold latency value, further comprising the step of said command decoder front end performing said first group of memory control steps in response to said first command packet,
wherein said second group of memory control steps excludes said first group of memory control steps.

20. A method according to claim 18, wherein said command decoder front end determines that the desired latency value associated with said first command packet is not below said predetermined threshold latency value, further comprising the step of said first command sequencer performing said first group of memory control steps in response to receipt of said command from said command decoder front end.

21. A method according to claim 18, wherein said incoming command packets include a command type indicator, further comprising the step of wherein said command decoder front end determining the desired latency value for said first command packet in dependence upon the command type indicator in the first command packet.

22. A method according to claim 14, further comprising the steps of:
said command decoder front end further indicating a latency value to said first command sequencer in conjunction with said step of said command decoder issuing a command to a first command sequencer; and said first command sequencer inserting at least one latency wait state in dependence upon said latency value indicated by said command decoder front end, after receipt of said command from said command decoder front end and prior to said step of performing a second group of at least one memory control step.

23. A method according to claim 14, further comprising the step of said command decoder front end selecting said first command sequencer from among a plurality of parallel command sequencers in response to receipt of said command packet.

24. A method of operating a memory device for use in a packet-driven memory system comprising the steps of:

receiving external command packets in a command front end circuit;

decoding said external command packets into internal commands in said command front end circuit;

issuing said internal commands to respective selected ones of a plurality of command sequencers; receiving each of said internal commands from the command front end circuit into the respective selected sequencer;

performing a first group of control steps for a respective given internal command decoded from each given one of said external command packets, either in the command front end circuit or in the sequencer selected for the given internal command, selectably in dependence upon a comparison of a latency value associated with the given external command packet with a threshold latency value; and performing a second group of control steps for the given internal command in the sequencer selected for the given internal command.

25. A method according to claim 24, further comprising the steps of:

receiving in the command sequencer selected for each given internal command a latency indication from the command front end circuit; and entering a wait state for a selected number of clock cycles in dependence upon the command delay indication for each given internal command, after receipt of the given internal command in said step of receiving internal commands, and prior to said step of performing a second group of at least one memory control step.

26. A method for processing commands in a memory system having a command module and multiple memory modules coupled together via command and data links, the method comprising the steps of:

issuing a command packet from the command module to a selected memory module, the command packet having a latency value associated therewith;

receiving the command packet in the selected memory module via a command decoder front end;

decoding the issued command packet into an internal command;

internally issuing the decoded command to a selected one of a plurality of parallel functional units;

performing a first group of control actions in the command decoder front end if the latency value is less than a predetermined latency threshold; and performing a remaining group of control actions in the selected parallel functional unit.

27. A method of operating a memory device for use in a packet-driven memory system comprising the steps of:

receiving external command packets in a command front end circuit;

decoding one of the external command packets to produce an internal command in the command front end circuit;

issuing the internal command to a selected one of a plurality of command sequencers;

performing a first group of control steps in the command front end circuit;

receiving the internal command from the command front end circuit into the selected sequencer;

receiving a command delay output from the command front end circuit into the selected sequencer;

entering a wait state for a selected number of clock cycles if a latency value associated with the internal command is greater than a predetermined latency threshold, and executing remaining control steps in the selected command sequencer.

* * * * *